United States Patent [19]
Simons

[11] 3,724,817
[45] Apr. 3, 1973

[54] LONG LINE LOITER TECHNIQUE
[75] Inventor: John C. Simons, Dayton, Ohio
[73] Assignee: The United States of America as represented by the Secretary of the Air Force
[22] Filed: Dec. 10, 1970
[21] Appl. No.: 97,413

[52] U.S. Cl. ............... 258/1.4, 89/1.5 R, 244/137 R, 244/138 R
[51] Int. Cl. ............................................. B64d 1/00
[58] Field of Search ...244/137, 138; 89/1.5; 258/1.2, 258/1.4

[56] References Cited

UNITED STATES PATENTS

| | | | |
|---|---|---|---|
| 1,829,474 | 10/1931 | Chilowsky | 244/138 R |
| 2,151,395 | 3/1939 | Smith | 244/138 R |
| 3,141,641 | 7/1964 | Beadle et al. | 244/138 R |
| 3,167,278 | 1/1965 | Roberge | 89/1.5 X |

OTHER PUBLICATIONS

National Geographic, Vol. 133, No. 2, February, 1968, page 294.

Primary Examiner—Samuel W. Engle
Attorney—Harry A. Herbert, Jr. and Arthur R. Parker

[57] ABSTRACT

A unique technique for remotely locating a mass tethered by means of a tow-line to a fixed wing aircraft in a loiter position over, or on a selected target by initially forming the tethered tow line into a long loop preferably by use of a high drag device, while the mass is held within the aircraft, and subsequently free falling the mass from the aircraft to its remote, loiter position on target, while the aircraft is engaged in an on-pylon circling maneuver to thereby stall the line.

5 Claims, 10 Drawing Figures

PATENTED APR 3 1973 3,724,817

INVENTOR.
JOHN C. SIMONS
BY Harry A. Herbert Jr
ATTORNEY
Arthur R. Parker
AGENT

PATENTED APR 3 1973 3,724,817
SHEET 2 OF 3
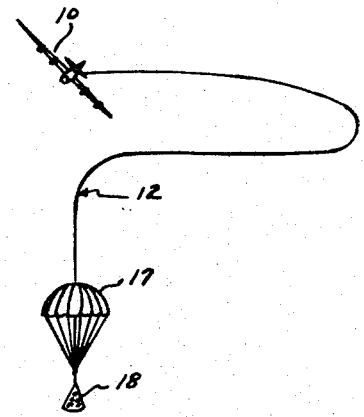
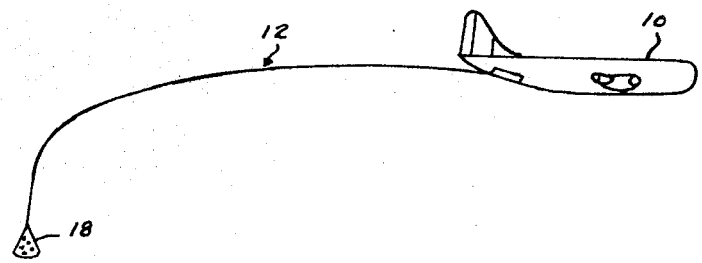
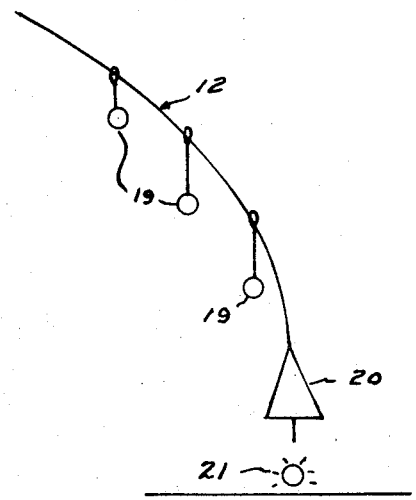
INVENTOR.
JOHN C. SIMONS
BY Harry A. Herbert Jr.
ATTORNEY
Arthur R. Parker
AGENT INVENTOR.
JOHN C. SIMONS
BY Harry A. Herbert Jr
ATTORNEY
Arthur R. Parker
AGENT

LONG LINE LOITER TECHNIQUE

BACKGROUND OF THE INVENTION

This invention relates generally to the remote positioning of a towed mass over a selected target area from a fixed wing aircraft engaged in a circling maneuver.

In the development, for example, of the positioning of ordance on target by U. S. strike aircraft, various delivery techniques have been previously proposed, many of which have actually been used in combat. These techniques all have had one common purpose; namely, to enable the aircraft to effectively engage the target, while minimizing its required time over the target area and thus reducing its opportunity for loss or damage from hostile small arms fire. A similar proposal that has been previously studied and which is considered of great applicability in this area has involved a suggested technique for retrieving objects, in which the aircraft circles a preselected pick-up site while paying out a tethered pick-up line, the end of which is to loiter at the pick-up site. In this proposal, the aircraft is supposed to continue to circle until the line moves into an equilibrium state whereby the lower end thereof is to describe a circle around the pick-up site at the same angular velocity as the circling aircraft, but of a much smaller diameter. However, this suggested method, as well as other similar proposals previously studied, have involved the use of a single and long tow-line, which has been found to be particularly sensitive to one or more of four main problems, which have previously curtailed further development; namely, the problem of vertical bounce (yo-yo) of the mass, elliptical motion of the mass, difficulty in maintaining a constant radius turn, and the effects of wind and turbulence. The present invention, to be hereinafter summarized and described in detail, was developed to eliminate or, at least drastically reduce, the effects of the aforementioned problems involved in the previously-suggested use of a relatively long and single tow line.

SUMMARY OF THE INVENTION

The present invention consists briefly in the positioning and holding of a mass tethered to an aircraft at the end of a long tow line at the center of an on-pylon circling maneuver, preferably by use of a high drag device consisting of a high-drag cone slidably mounted on the line, or a parachute fixed thereto to initially uniquely form the line into a long loop, prior to the release of the tethered mass from the aircraft. Afterwards, the mass is released while the aircraft proceeds into the on-pylon circling maneuver to thereby stall the line and thus permit the line and mass to fall to a loiter position over, or on the target area.

Other objects and advantages of the invention will become readily apparent from the following disclosure thereof, taken in connection with the accompanying drawings, in which;

BRIEF DESCRIPTION OF THE DRAWINGS

FIG. 4 is still another front view, partly schematic, of second, modified form of the double-line delivery technique of the present invention, as it is applicable to a para-loiter system, in which a parachute may be attached as shown to the tow-line at a relatively short distance above the mass supported thereby;

FIG. 5 is a further partly schematic, side elevational view, illustrating the basic launch configuration of the invention;

FIG. 6 is a schematic and fragmentary view, showing use of selected mass slide devices that may be applicable to the improved long line loiter technique of the present invention.

DESCRIPTION OF THE PREFERRED EMBODIMENT

Figure 1:
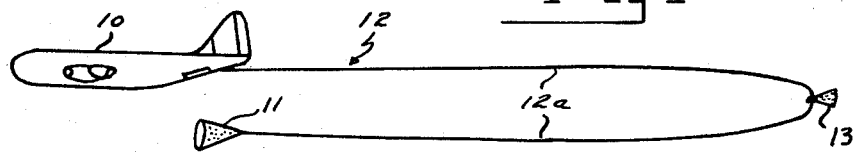
FIG. 1 is a side elevational and partly schematic view of the maneuver aircraft and improved long line loiter technique of the present invention, illustrating the initial formation of the tow line into a relatively long loop, and the position of the tethered mass from the towing aircraft just after its initial release therefrom.
Figure 2:
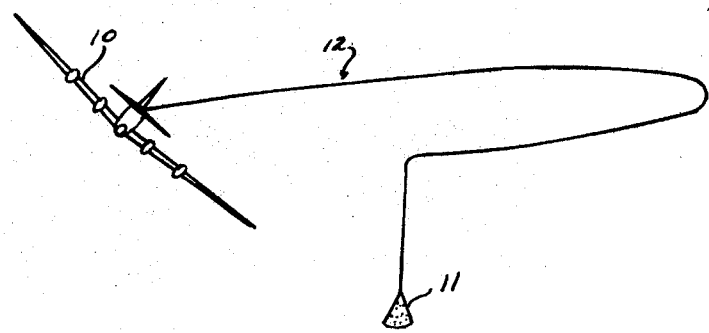
FIG. 2 is a front and partly schematic view, illustrating both the aircraft of FIG. 1 after its entry into an on-pylon circling maneuver, and the stabilization of the tethered line and mass attached thereto in, or preparatory to, its repositioning in loiter over, or on the target area.

Referring generally to the drawings and, in particular, to FIG. 1 thereof, a tow line to which the novel long line loiter deployment technique of the present invention may be applied is illustrated generally at 12 as being tethered to a fixed wing-type aircraft indicated schematically at 10. A main mass, depicted by the relatively large, perforated cone-like element at 11, is shown attached to one end of the tow line 12, the other end of which naturally being wrapped around any standard-type of reel mechanism (not shown) that may be mounted within the aircraft. When it is desired to remotely position the mass 11 in loiter position over, or on a selected target, or at a pick-up site, the aircraft 10 is, of course, initially flown to the target area. At this time, the novel long line loiter technique taught by the present invention may be employed by initially deploying the tow line 12, which may in one application be 2,000 feet in length, into a long loop, indicated generally at 12a, while holding the cone-mass 11 in the aircraft. This long loop, in effect, creates a double-line. During initial tests of this double-line system, it was found that knots developed in both sections of the tow line 12 and, therefore, a small sliding cone, indicated at 13, was thereafter used both to eliminate such knots and to act as a relatively high drag device operating to hold constant tension on, and thus ensuring the maintenance of the long loop or double-line 12a initially formed in the tow line 12. After forming the tow line 12 into the aforesaid long loop 12a, in one test thereof, the cone-mass 11 was thereafter level-bombed from the aircraft 10 from an altitude of approximately 900 to 1,000 feet. The position of this mass 11 shortly after exiting from the aircraft 10 is depicted in the view of the aforementioned FIG. 1. Immediately after dropping the mass 11 from the aircraft 10, the latter is flown into a constant bank orbit approximating an on-pylon circling maneuver, as is illustrated in FIG. 2, for the specific purpose of stalling and, in this manner, allowing the tow line 12 with the mass 11 attached thereto to free-fall in a substantially vertical direction and at the approximate center of the on-pylon maneuver to the selected target or pick-up site. In this regard, during tests of the above-described long line loiter technique, which may be designated the "Double-Line, Free-Fall" delivery method, considerable and improved stability of of the towed mass in loiter position was evident when the towing aircraft being used was able to complete a total of 27 orbits in a 15 knot wind while a ground observer hand held the attached mass. During this time, the tow line, as at 12, never touched the ground.

A second delivery method, utilizing the present long line loiter or double-line free-fall technique, involves the application thereof when the mission of the delivery aircraft 10 requires its flight at low skip-bomb altitudes. In this event, the tow line 12 would initially be only partially deployed into the inventive long loop or double-line configuration to avoid excessive lays of the line on the ground. Thus, after delivery of the mass 11 on, or at the target site in the same manner described hereinbefore, the aircraft 10 would be maneuvered out of its circling attitude into a straight-and-level configuration, and the line 12 would be fully deployed as full power is applied to the aircraft in a tight climbing spiral.

Figure 3:
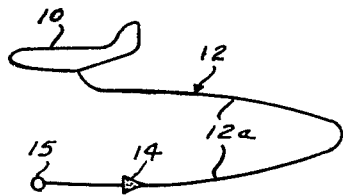
FIGS. 3 and 3a respectively illustrate side elevational and front views, partly schematic, of a unique modified form of the improved long line loiter technique of the present invention, as it may be applied to a double-mass system, in which a second mass may be fixed to the tethered line at a preselected distance above the first mass attached at the end thereof.
Figure 3A:
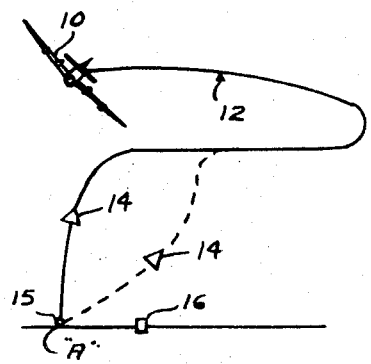

The present improved long line loiter or double-line free fall method has been found applicable to a second modified delivery technique in which, as is seen particularly in FIGS. 3 and 3a, a second, high cone-shaped mass, as at 14, is depicted attached to the tow line 12 at a position thereon above, and in spaced relation, to the low mass 15 attached to the end of the tow line. The cone mass 14 may be affixed to the line 12 from 100-200 feet above the mass 15. Again, as in the case of the invention form of FIGS. 1 and 2, the tow line 12 is initially payed or reeled-out of the aircraft 10 while both high and low masses 14, 15 are retained within the aircraft, and while the latter is in straight-and-level flight. After the line 12 has been fully deployed into the long loop or double-line configuration 12a of the present invention, the double-mass arrangement 14 and 15 is then level-bombed from the aircraft 10 as the latter is once again maneuvered into the on-pylon circling maneuver with the selected target, as at 16 (Note FIG. 3a) oriented at the center thereof.

With the aforementioned double-line, double mass technique, improved accuracy of delivery was achieved in actual tests by initially allowing the lower mass 15 to free fall to an impact position on the ground at a point "A" (FIG. 3a) near, but to one side (the upwind side) of the target 16. Thereafter, the aircraft 10 continued in its orbit until the airborne cone-mass 14 arrived at a loiter position over the target 16. Its positioning on the said target 16 was then achieved either by reeling out more of the tow line 12, or by lowering the aircraft 10.

The previously-described double-line, free-fall and double-mass, double-line delivery methods also offer the inherent capability of promoting the continuous delivery of selected masses on, or immediately over a designated target area, as for example where it is desired to saturate such an area with ordnance. In this event, light high-explosive ordnance in the form of solid cluster bomb units, as is indicated generally at 19, for example, in the schematic, fragmentary view of FIG. 6, may be continuously slid down the loitering tow-line 12 for ground impact in the area of the target at 21, after breaking-off the said line on striking the mass-device at 20. The latter action is also used to arm the said ordnance. The device 20 could also represent a wide-angle camera for recording the actual explosions for later bomb damage assessment.

With particular reference to FIG. 4 of the drawings, the present invention is shown applied to, and forming an integral part of still another delivery method, known as the "Para-Loiter" delivery method, in which the apex of a parachute, as at 17, may be attached by a ground observer at a pick-up site to the tow line 12 at a relatively short distance of from 100-200 feet, for example, above a mass 18 that is affixed to the end thereof. Of course, in one application, the mass 18 could be previously remotely positioned in loiter over the pick-up site by the formation of the double loop configuration in, and the circling maneuver-deployment of, the tow-line 12 involved in the previously-described, novel double-line, free-fall delivery means of the present invention. As an alternative arrangement, the parachute 17 with a mass, such as 18, already suspended thereto could be attached to the tow-line at the pick-up site, or the parachute 17 and mass 18 could both be attached within the aircraft, if desired.

In the event the parachute 17 has been affixed to the tow-line 12 (Note FIG. 4) at the aforementioned pick-up site, the aircraft 10 would then leave orbit and enter into a straight-and-level flight condition, at which time the ground observer would release the parachute 17 and attached mass 18 from the pick-up site, and thus provide for the launching thereof into trail behind the aircraft. In this regard, FIG. 5 depicts the basic initial launch configuration involving application of the present invention with the mass 18 shown attached to the tow line 12. Naturally, in the para-loiter delivery method, the previously-noted parachute 17, in deflated condition, would be attached to the tow-line 12, as was previously-described in connection with FIG. 4. Subsequently, the aircraft would arrive over a predesignated target area where it would be maneuvered into a turn towards the towed parachute 17 and mass 18, the maneuver being similar to the previously-noted on-pylon maneuver. The latter action results in placing slack in the tow-line 12 and, in effect, again forms substantially the same-type of double-loop configuration instrumental in accomplishing the long line loiter technique of the present invention, as has been previously described. This slackening of the tow-line 12 naturally stalls it, and thereby permits the mass 18 to begin to fall and initially effect a partial inflation and opening of the parachute 17 into a crescent-shaped high drag airfoil. The mass 18 continues to fall and the parachute 17 thereafter fully opens. The aircraft 10 continues its circling maneuver around the open parachute 17 until ground contact or a pre-selected minimum altitude in loiter is reached by the parachute, which configuration would be substantially that depicted in FIG. 4, particularly for a no-wind situation. The aircraft 10, after accomplishing its mission, would then fly away from the parachute 17, and the parachute 17 and attached mass 18 would once more be automatically launched into trail behind the aircraft. Therefore, with this para-loiter arrangement, the parachute 17 uniquely acts both as a passive sensor, and as a high drag device, lifting surface during trail and, finally, as a slow descent loiter device.

Although the elements 11, 15 and 18 of the inventive forms of FIGS. 1, 3 and 5 have each been described simply as a "mass," it is to be understood that they may represent any one or more of a number of different "-devices" to be employed, for example, either by U.S. strike aircraft in combat, or by other aircraft engaged in peacetime pursuits. Thus, for instance, one such device would be the already-referred to camera 20 of FIG. 6, or it could consist of a loudspeaker positioned either at the high mass 14 of FIG. 3 or at the mass 18 of FIG. 4, or, alternatively, many other selected devices could be utilized, such as aerial display signs, or remotely positioned anti-fire explosives or dilutors.

Figure 7:
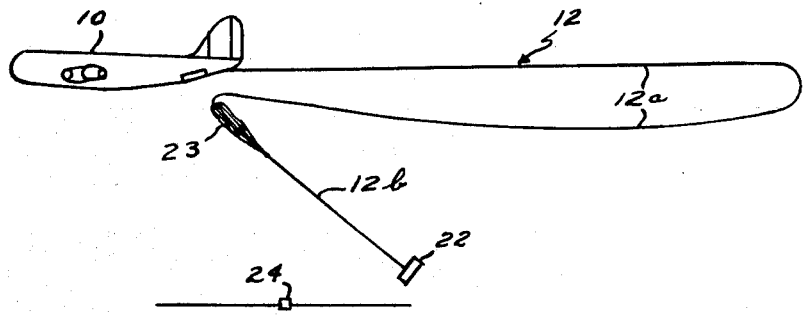
FIGS. 7, 8 and 9 respectively illustrate schematic views, in side elevation, of the three progressive stages involved in the delivery of a mass at a selected ground site by means of a further modified form of the improved long line loiter system of the present invention.
Figure 8:
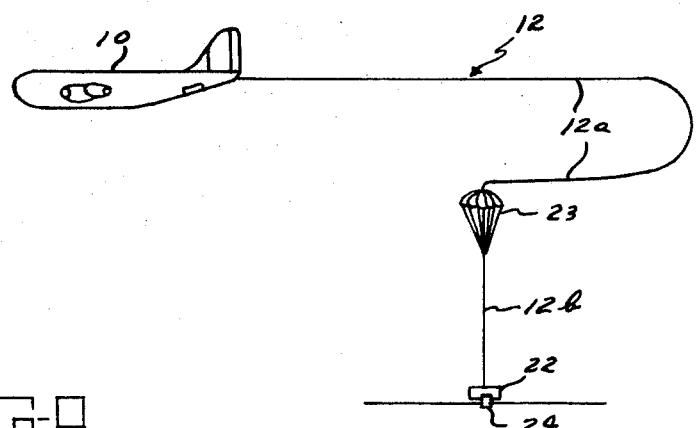
Figure 9:
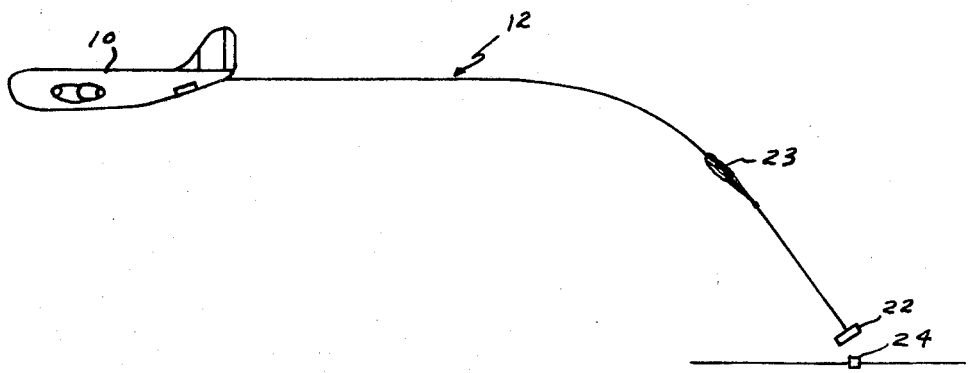

With particular reference to FIGS. 7, 8 and 9, the aircraft at 10 is depicted as employing a still further modified form of the present invention, in which the remote sampling of soil and water located on the earth's surface may be accomplished from the air by the modified use of the unique long line loiter system of the present invention. To this end, once again the tow-line, indicated generally at 12, may be initially deployed from the aircraft 10, as the latter approaches the selected ground site, into the inventive long loop or double-line configuration at 12a, while a mass at 22 attached to the end of the said line and a 3-foot parachute at 23 attached to the line 12 at a position thereon approximately 400 feet above the mass 22 are retained within the aircraft. For test purposes, a target-mass at 24 was positioned on the ground, and the aircraft 10 was then flown in a straight pass at approximately 500 feet over the target 24 (FIG. 7), as the previously-noted airborne mass 22 was then parachuted by means of the parachute 23 to the ground position represented by the said target 24 for a total of 8 seconds of contact. This delivery method is different from the previously-described methods in that the aircraft 10 is never turned during delivery or pick-up. In this regard, it is noted that in practice the mass 22 would actually be a particular device designed to accomplish the requisite picking up of either a soil or a water sample.

In the view of FIG. 7, the tow-line 12, after the initial parachuting of the mass 22 from the aircraft 10, gives an overall appearance of incorporating three separate lines, although only one line is actually utilized, and, therefore, the present system of FIGS. 7, 8 and 9 has been designated the "3-Line Pickup." In this connection, after release of the mass 22 and parachute 23, the mass 22 actually assumes a position approximately 100 feet above the ground shortly after its ejection from the aircraft, since the short-line portion at 12b is approximately 400 feet in length, and the aircraft 10 is being flown at an altitude of about 500 feet, as previously-noted. However, since on exiting from the aircraft 10, the parachute 23 is initially in deflated condition, the mass 22 largely assumes the momentum imparted to it by the aircraft and, accordingly, it actually initially swings into a position somewhat beyond the designated ground target at 24. Immediately thereafter, of course, the parachute 23 opens and its substantial drag effect nullifies the said momentum and causes the mass 22 and its 400 foot short line 12b to swing backwards to a vertical position towards the target 24. Of course, since the parachuted mass 22 has now also been descending towards the ground, its initial release from the aircraft 10 at the proper position results in its impact on the ground target 24, and the configuration substantially depicted in FIG. 8 is assumed.

As depicted in the view of the aforementioned FIG. 8, the high line or, in other words, the initially formed double-line configuration at 12a continues to uncoil its loop as the aircraft 10 retreats or flies away from the target 24. The tow-line 12 shortly thereafter assumes a single line configuration and thus lifts or launches the parachute 23 and mass 22 into trail behind the aircraft 10. Prior to its assumption of the full trail position, the now deflated or folded parachute 23 acts to enhance the verticality of the launch by serving as a lifting surface under tow, as is schematically depicted in the view of FIG. 9.

Thus, a new and improved basic technique for remotely positioning an aircraft-towed mass representing a selected device to be employed or delivered over, or on a predesignated target or pick-up site has been developed by the unique and yet simplified long line loiter technique of the present invention. Moreover, by use of the present double-line technique, a selected mass may be air delivered in loiter position either ballistically on target, or particularly by use of the double-mass technique, utilized to deliver other slidably mounted masses to the selected target site, or by application of the para-loiter technique, greatly facilitate the remote positioning of selected masses on target at near zero velocities and, in addition, promote the retrieval of such masses for delivery at a second site.

I claim:

1. In means for delivering an airborne device, adapted to be towed from a fixed wing aircraft, in a relatively stable and extended loiter position on, upwind of, or over a selected ground site, and up to considerable distances away from the flight path of the aircraft, the steps including; initially providing for the attachment of the device at, or near the free end of a single, unitary tow cable adjustably affixed at its other end to the aircraft and providing the sole and otherwise unrestrained connection between the device and the aircraft; said tow cable having a combined cable-deploying and cable-tension-applying mass slidably positioned thereon; next, flying the aircraft initially in a substantially straight-line mode over, upwind of, or near the selected ground site, depending on the existence of a wind, and its direction and velocity and/or the type of device being employed; then deploying all, or at least a substantial portion of the tow cable in a relatively long and narrow loop-double-line configuration initially in extended trail behind the aircraft, by the concerted action resulting from the ejection and paying out from the aircraft of a significant and intermediate portion of the cable through the simultaneous release therewith of the combined cable-deploying and cable-tension-applying mass slidably positioned on the cable, and the retention of the device and the free end of the cable attached thereto with the aircraft until the length of the double-line configuration desired for the cable and compatible with the release altitude of the aircraft has been achieved; subsequently releasing the free end of the cable and the device attached thereto by level-bombing from the aircraft; and immediately thereafter stalling the cable and attached device by maneuvering the aircraft into a substantially constant bank, on-pylon -type of circling line maneuver, with the pylon/center thereof being thereby definitely placed over, or upwind of the selected ground site, and the stalled device being oriented in direct alignment with the said pylon/center and thereby being automatically restrained by the said on-pylon maneuver, to a positive free fall and paying out of the double-line portion of the tow cable, until the said device has arrived at a relatively stabilized and prolonged loiter position over, or on the selected ground site.

2. In means for delivering an airborne device in loiter position on, or over a selected ground site as in claim 1, wherein the initial step of attaching the device to the tow cable further comprises the additional steps of providing both for the attachment of the said device at a position on the tow cable above the end thereof and therefore constituting a first, relatively high mass to be deployed with the tow cable in the said loiter position above the selected ground site; and a second, low mass affixed to the end of the tow cable and constituting an anchor means impacting adjacent, and to one side of the selected ground site, during the aircraft maneuvering step, to thereby positively ensure that the loiter position of the device is oriented at a substantially fixed location over said ground site.

3. In means for delivering an airborne device in loiter position on, or over a selected ground site as in claim 2, wherein the free-fall of the device to said loiter position initially resulting from the aircraft maneuvering step further includes the additional step of still further deploying the tow cable from the aircraft to thereby lower the anchored first, high mass, constituting the device to be deployed, on the selected ground site.

4. In means for delivering an airborne device in loiter position on, or over a selected ground site or target as in claim 1, wherein the step comprising maneuvering the aircraft into an on-pylon/circling line maneuver to thereby stall the tow cable still further includes the additional step of attaching the apex of a parachute to the tow cable at a relatively short distance above the device to thereby provide for the more stable parachute delivery thereof to a loiter position at near zero velocity after the aerial transport towing of the selected device from a pick-up site to the selected ground site.

5. In means for delivering an airborne, water or soil sampling device, adapted to be towed from a fixed wing aircraft by an elongated, single unitary tow cable having a first, free end and a second, restrained end adjustably affixed to the aircraft, on a selected group or water target site, the steps comprising; initially providing for the attachment to the said free end of the tow cable of the said device, and for the further attachment of a parachute at a substantial and predetermined distance above the said free end and thereby respectively dividing the overall tow cable into a relatively short, lower cable portion directly attached to the device and a relatively long, upper cable portion affixed to the aircraft; then retaining the device, the free end and relatively short, lower cable portion, and the parachute within the aircraft; thereafter, upon flying the aircraft over the selected target site in a straight pass, deploying the said relatively long, upper cable portion in a double-line configuration that is relatively long by comparison to the length of the said relatively short, lower cable portion, while retaining the aircraft in straight-and-level flight, by the simultaneous release therewith of a cable tension-applying mass slidably positioned on said cable; and, immediately after completing the deployment of the said relatively long, upper cable portion into the double-line configuration, releasing said airborne, water and/or soil-sampling device, and the parachute attached to the said relatively short, lower cable portion, while simultaneously and continuously maintaining the aircraft in a straight pass over and beyond the target site, to thereby parachute the device to the selected site from the drag effect produced by the automatic inflating of the said parachute thereafter nullifying the momentum initially imparted to the device, upon its release from the aircraft, and causing it to swing in an arc rearwardly past the selected ground or water target site, to thus bring the device back to a vertically-disposed and descending condition directly over and effecting contact with the selected ground or water target site.

* * * * *